US00RE47305E

(19) United States
(12) Reissued Patent
Keepers

(10) Patent Number: US RE47,305 E
(45) Date of Reissued Patent: Mar. 19, 2019

(54) HOLSTERING A GUN

(71) Applicant: Spencer Keepers, Yukon, OK (US)

(72) Inventor: Spencer Keepers, Yukon, OK (US)

(21) Appl. No.: 15/480,298

(22) Filed: Apr. 5, 2017

Related U.S. Patent Documents

Reissue of:
(64) Patent No.: 9,222,750
Issued: Dec. 29, 2015
Appl. No.: 13/761,962
Filed: Feb. 7, 2013

(51) Int. Cl.
*F41C 33/02* (2006.01)

(52) U.S. Cl.
CPC ..... *F41C 33/0209* (2013.01)

(58) Field of Classification Search
CPC .. F41C 33/0209; F41C 33/0218; F41C 33/02; F41C 33/008
See application file for complete search history.

(56) References Cited

U.S. PATENT DOCUMENTS

| | | | | | |
|---|---|---|---|---|---|
| 3,583,612 | A | | 6/1971 | Theodore | |
| 3,713,239 | A | * | 1/1973 | Sperling | 42/70.07 |
| 3,718,240 | A | * | 2/1973 | Rose | 224/243 |
| 3,804,306 | A | * | 4/1974 | Azurin | 224/193 |
| 3,915,361 | A | | 10/1975 | Perkins | |
| 4,094,450 | A | | 6/1978 | Pariante | |
| 4,253,592 | A | | 3/1981 | Anderson | |
| 4,410,118 | A | * | 10/1983 | Taurisano | 224/222 |
| 4,504,001 | A | | 3/1985 | Nichols | |
| 4,577,787 | A | * | 3/1986 | Hersey | 224/243 |
| 4,591,081 | A | * | 5/1986 | Bianchi et al. | 224/192 |
| 4,694,980 | A | * | 9/1987 | Rogers | 224/243 |
| 4,815,641 | A | * | 3/1989 | Bianchi et al. | 224/238 |
| 5,100,036 | A | | 3/1992 | Rogers et al. | |
| 5,127,566 | A | * | 7/1992 | Beletsky | 224/243 |
| 5,215,238 | A | * | 6/1993 | Baruch | 224/243 |
| 5,282,559 | A | * | 2/1994 | Wisser et al. | 224/243 |
| 5,419,474 | A | * | 5/1995 | Marx | F41C 33/0227 224/193 |
| 5,501,380 | A | * | 3/1996 | Wu | 224/243 |
| 5,501,381 | A | * | 3/1996 | Rogers et al. | 224/243 |
| 5,909,834 | A | | 6/1999 | Parrott | |
| 5,944,239 | A | * | 8/1999 | Rogers et al. | 224/193 |
| 6,089,432 | A | | 7/2000 | Gage et al. | |
| 6,264,079 | B1 | | 7/2001 | Skaggs | |
| 6,604,657 | B2 | * | 8/2003 | Yirmiyahu et al. | 224/243 |

(Continued)

*Primary Examiner* — Jeffrey L Gellner
(74) *Attorney, Agent, or Firm* — R. Tracy Crump

(57) ABSTRACT

An apparatus and associated methodology for holstering a gun. A holster has a longitudinally-extending sidewall terminating at a gun entry edge. The sidewall has an inner surface defining a cavity that is sized for slidingly inserting the gun to a mating engagement of the gun in the holster at a holstered position of the gun. The sidewall supports a holster trigger guard terminating adjacent the gun entry edge. The holster trigger guard extends from the sidewall and adjacent the cavity so that a holster trigger guard surface operably impacts against the user's finger at an acute angle, so that a force from the impact has a proximal force directed away from the tip of the user's finger. A concealment block is removably attachable to the sidewall at a selected one of a plurality of different attachable positions to be operably interposed between a user's body and the holster to urge a selected portion of the holster away from the user's body.

15 Claims, 12 Drawing Sheets

(56) References Cited

U.S. PATENT DOCUMENTS

| | | | | |
|---|---|---|---|---|
| 6,691,374 | B2 | 2/2004 | Coyne | |
| 6,691,906 | B2 * | 2/2004 | Cragg | A45F 5/021 224/236 |
| 6,752,299 | B2 | 6/2004 | Shetler | |
| 6,763,984 | B2 | 7/2004 | Gallagher | |
| 6,769,581 | B2 * | 8/2004 | Rogers et al. | 224/243 |
| 6,889,879 | B2 | 5/2005 | Rivera | |
| 7,204,395 | B2 | 4/2007 | Gallagher | |
| 7,461,765 | B2 * | 12/2008 | French et al. | 224/243 |
| 8,235,263 | B1 | 8/2012 | Yeats | |
| 8,371,487 | B1 * | 2/2013 | Plappert | 224/193 |
| 8,602,275 | B1 * | 12/2013 | Kiger et al. | 224/243 |
| 2005/0127121 | A1 | 6/2005 | Skurdal | |
| 2005/0184115 | A1 | 8/2005 | Wells | |
| 2009/0321480 | A1 * | 12/2009 | Kincaid et al. | 224/243 |

* cited by examiner

HOLSTERING A GUN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

The present technology relates generally to gun carrying and more particularly without limitation to novel gun holster technology and associated methodology. *The present application is an application for reissue of U.S. Pat. No. 9,222,750 B1.*

BACKGROUND

There are a wide variety of devices that are designed to be worn by the user in order to carry a gun on his or her body. A holster is such a device that is generally a hollow trapezoidal-shaped sheath forming a cavity into which the user's gun can be inserted to fit in a secure, close mating engagement.

The margin for error is extremely small when handling a gun; a mistake can cause serious injury and even death to the user. Holstering a gun requires the user to violate a fundamental rule of gun safety; never let the muzzle cover anything you are not willing to destroy. That is, the user must point the gun toward himself while inserting the gun into the holster. A negligent discharge at this juncture means the user shoots himself; the last thing intended but, unfortunately, too often the case.

An important technique to prevent a negligent discharge during holstering a gun is to always be sure to withdraw the trigger finger from the gun's trigger guard before beginning to insert the gun into the holster. Otherwise, the trigger finger impacting against the top edge of the holster forces the trigger finger in the direction that operates the gun's trigger—causing the undesirable negligent discharge. It is not unusual during holstering a gun that the user is still subject to an adrenaline rush resulting from the need to withdraw and fire the gun, or the escalation of force generally. That creates a common situation where an otherwise clearly objective, well-trained, and clear-thinking individual still inadvertently makes a gun handling mistake like holstering the gun with his or her finger still within the gun's trigger guard. The present technology is directed to a novel apparatus and associated methodology that reduces the likelihood of a negligent discharge of a gun during holstering.

SUMMARY

Some embodiments of the present invention contemplate a holster for a gun that protects a user from a negligent discharge when holstering the gun with the user's finger inside the gun's trigger guard. The holster has a longitudinally-extending sidewall terminating at a gun entry edge. The sidewall has an inner surface defining a cavity that is sized for the user to slidingly insert the gun to a mating engagement of the gun in the holster at a holstered position of the gun. The sidewall supports a holster trigger guard terminating adjacent the gun entry edge. The holster trigger guard extends from the sidewall and adjacent the cavity so that a holster trigger guard surface operably impacts against the user's finger at an acute angle, so that a force from the impact has a proximal force directed away from the tip of the user's finger.

Some embodiments of the present invention contemplate a holster for a gun. The holster has a longitudinally-extending sidewall terminating at a gun entry edge. The sidewall defines a cavity sized for slidingly inserting the gun to a holstered position. A concealment block is removably attachable to the sidewall at a selected one of a plurality of different attachable positions to be operably interposed between a user's body and the holster to urge a selected portion of the holster away from the user's body.

Some embodiments of the present invention contemplate a method including operations of obtaining a holster having a longitudinally-extending sidewall terminating at a gun entry edge and defining a cavity, the upstanding sidewall providing an angled holster trigger guard surface; selectively attaching a concealment block to the sidewall; and inserting a gun into the cavity so that a user's finger while disposed in the gun's trigger guard first contacts the angled holster trigger guard surface.

DETAILED DESCRIPTION

Initially, it is to be appreciated that this disclosure is by way of example only, not by limitation. The gun holstering technology herein is not necessarily limited to use or application with any specific type of gun holster. For purposes of this description and the claims the term "holster" generally means a device for bearing or storing a gun on a user's body or otherwise such as on a saddle, a car, a bicycle, and the like. The embodiments herein that are directed to an inside-the-waistband (IWB) holster are merely for the purpose of illustration and are in no way limiting. That is, the skilled artisan will appreciate that the described illustrative embodiments can alternatively be employed in other types of holsters, such as an outside-the-waistband holster, a shoulder holster, a brassiere or flash-bang holster, an ankle holster, a purse holster, a duty-type retention holster such as that sold by Safariland, LLC. of Jacksonville, Fla. under the brand name SAFARILAND®, and the like without the need for any additional description than what is provided herein.

Although the illustrative embodiments depicted herein are for an appendix-carry inside-the-waistband (AIWB) holster, the term "IWB" is used herein to generally include appendix-carry holsters as well as all other types of holsters. Thus, although the instrumentalities described herein are for the convenience of explanation, shown and described with respect to exemplary embodiments, it will be appreciated that the principles herein may be applied equally in other types of instrumentalities within the scope of the claimed embodiments.

Figure 1:
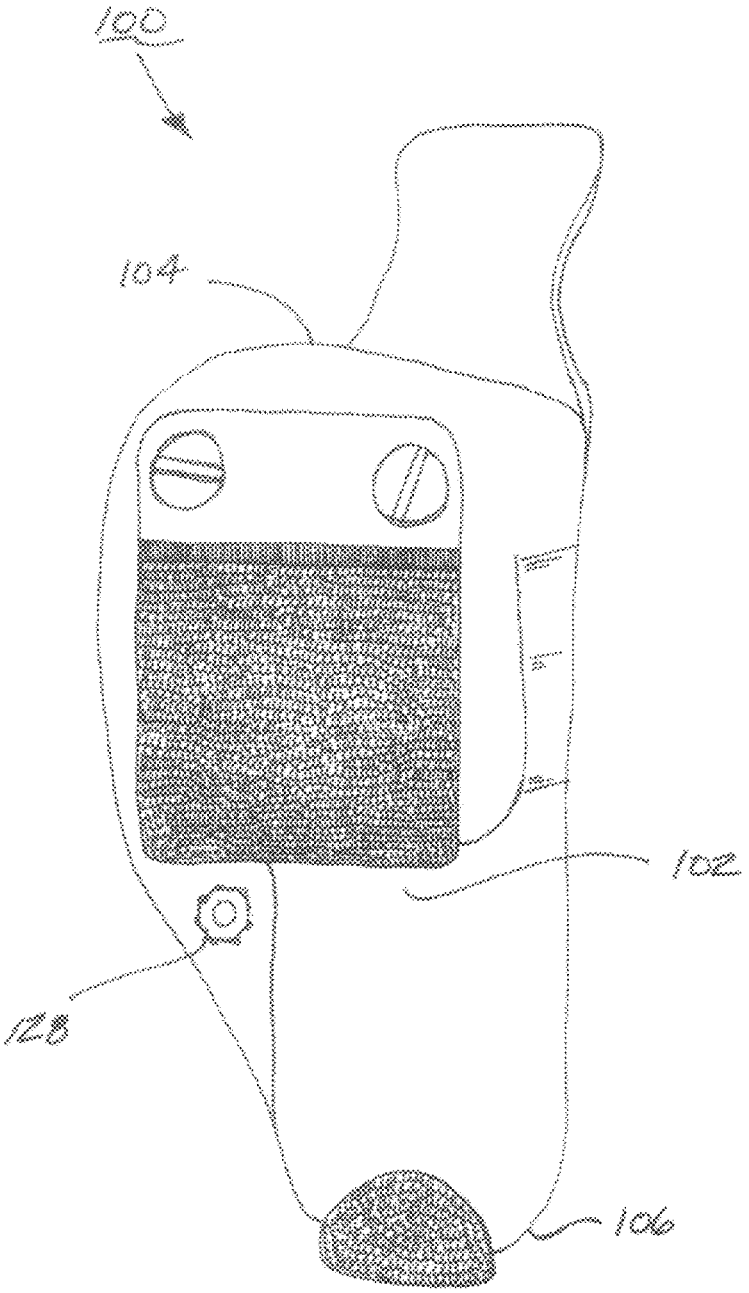
FIG. 1 is an elevational depiction of a holster that is constructed in accordance with illustrative embodiments of the present technology.
Figure 2:
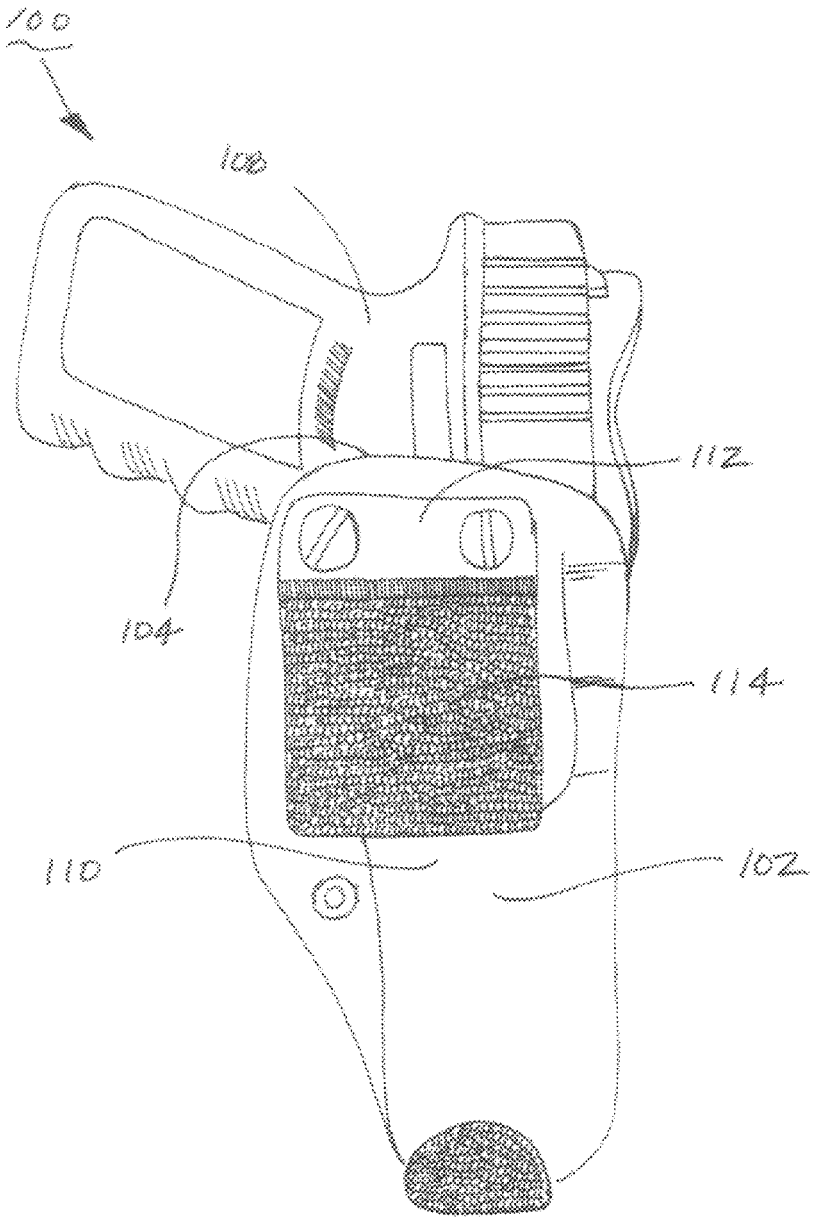
FIG. 2 is an elevational depiction like FIG. 1 but with a gun in a holstered position.

FIG. 1 is an elevational depiction of a holster 100 for a gun (not depicted in FIG. 1) that is constructed in accordance with illustrative embodiments of the present invention. The holster 100 is an IWB type of holster, although such is merely illustrative for purposes of this description of the more general technology, not limiting of the various types of holsters that can otherwise employ the disclosed technology. Any attempted enumeration of all types of holsters that are suited for practicing this technology would be unnecessary for the skilled artisan to understand the scope of the claimed invention from this illustrative description. The holster 100 generally has a longitudinally-extending sidewall 102 that extends from a gun entry edge 104 to an opposing gun barrel edge 106. FIG. 2 similarly depicts the holster 100 but with a gun 108 placed in a holstered position in the holster 100. In the holstered position the gun 108 is receivingly engaged in a close mating relationship within a cavity (depicted below) formed by the sidewall 102.

In this IWB type of holster 100 the sidewall 102 forms an outer side 110 that is farthest from the user's body when the holster 100 is worn. The outer side 110 supports a belt loop 112 defining an opening (depicted below) that is sized and positioned to receive a portion of the user's belt (not depicted) that is worn around his waist. The belt loop 112 may support the loop portion 114 of a hook and loop fastener (such as a Velcro® fastener) to provide an attachment surface for a tactical belt that may be used to wear the holster 100 of the present technology, or to attach some other useful article to the holster 100 while being worn.

Figure 3:
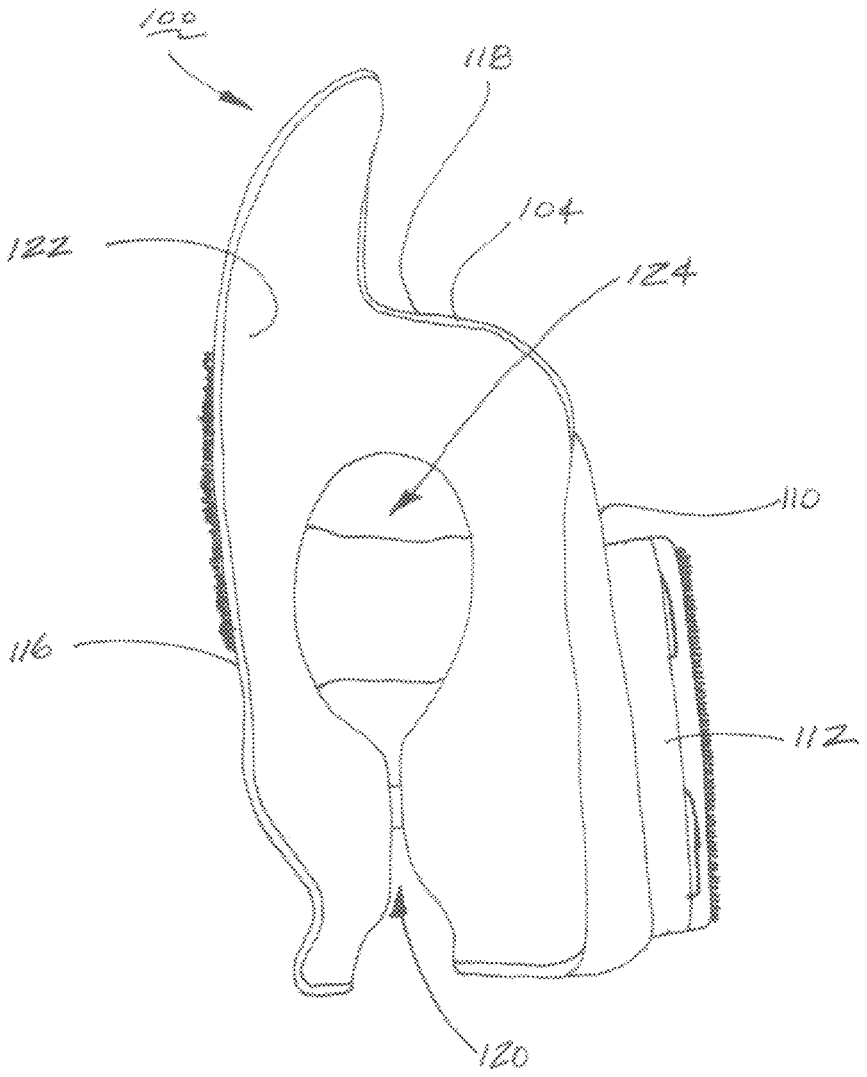
FIG. 3 is a top view of the holster of FIG. 1

FIG. 3 depicts an elevational view of the holster 100 from a perspective of the gun entry edge 104; that is, a top view of FIG. 1. In these illustrative embodiments the sidewall 102 forms the outer side 110 and an inner side 116 that is nearest the user's body when the holster 100 is worn. The sidewall 102 also has an end portion 118 that joins the outer and inner sides 110, 116 together. At an opposing end the outer and inner sides 110, 116 can be connected together by an adjustable connector 120.

The holster 100 in these illustrative embodiments can feasibly be constructed by thermally forming a polymeric material, such as a material marketed by Kydex, LLC of Bloomsburg, Pa. under the brand name Kydex®. A sheet of such material is commercially available with a textured surface and an opposing smooth surface. The holster 100 is preferably formed so that the smooth surface 122 of the sidewall 102 defines a cavity 124 that is sized for slidingly inserting the gun 108 (FIG. 2) to a close mating engagement of the gun 108 in the holster 100 at a holstered position of the gun 108. In the holstered position, the gun 108 is securely transportable, and in the case of the IWB holster 100 of these illustrative embodiments the gun 108 is also concealed beneath the user's clothing.

The molding process for constructing the holster 100 generally involves shaping stock material around a mold. The mold can be very specifically dedicated to one model of gun, or can more generally be adaptable for use by two or more different model guns that are generally the same size and configuration. For example, some different model guns vary only in barrel length and grip length, and as such those different models could conceivably be adequately holstered in the same size/configuration holster 100. In any event, the size of the cavity 124 can be adjusted via the adjustable connector 120 to increase or decrease the frictional engagement with which the gun 108 slidingly engages against the inner surface 122 of the sidewall 102 while the gun 108 is being inserted into or withdrawn from the holster 100.

Figure 4:
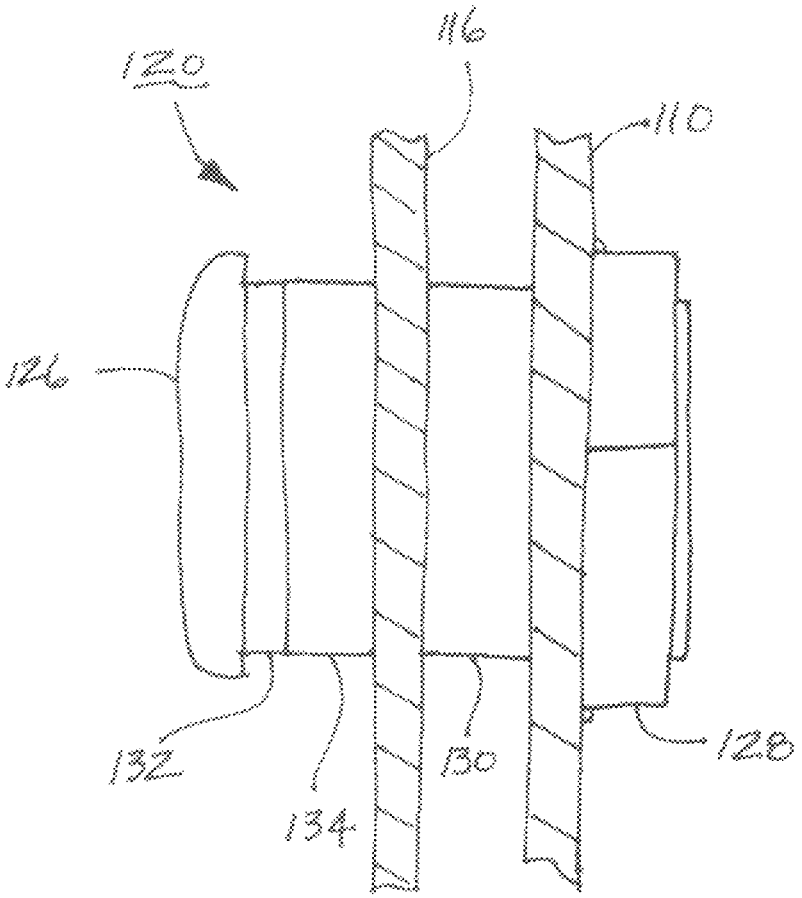
FIG. 4 is an enlarged partial cross sectional view of the adjustable connector of FIG. 3.

FIG. 4 is an enlarged cross sectional depiction of the outer and inner sides 110, 116 of the sidewall 102 and the manner of connecting them together via the adjustable connector 120 in accordance with these illustrative embodiments of the claimed technology. A fastener 126 (such as a threaded screw) passes through aligned apertures in the outer and inner sides 110, 116 and engages a capturing member 128 (such as a threaded locknut). A shim 130 is sandwiched between outer and inner sides 110, 116 in the tightened position of the threaded members 126, 128, providing a positive stop defining a spatial separation between the outer and inner sides 110, 116 and thereby a corresponding size of the cavity 124 (FIG. 3). The spatial separation can be reduced, to reduce the size of the cavity 124, by removing the shim 130 altogether or by replacing it with a smaller (less thick) shim 132. The spatial separation can be increased, to enlarge the size of the cavity 124, by adding one or both of the shims 132, 134 to the existing shim 130 between the outer and inner sides 110, 116.

Figure 5:
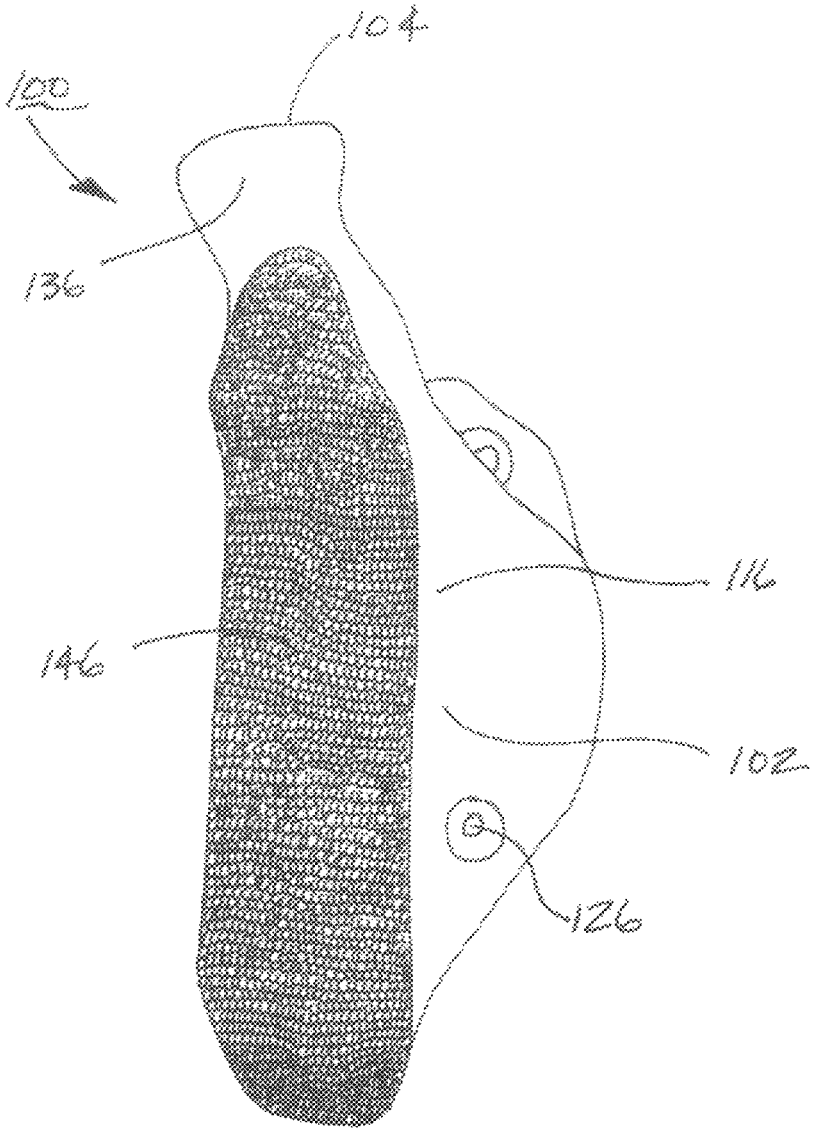
FIG. 5 is a rear view of the holster of FIG. 1.

FIG. 5 is an elevational depiction of the holster 100 from a perspective of the inner side 116; a rear view of FIG. 1. The inner side 116 may include a longitudinally extending protuberant portion 136 that extends substantially the length of the gun 108 (FIG. 2) in the holstered position. That advantageously provides for the gun 108 to slidingly engage the low friction inner surface 122 of the sidewall 102 throughout the entire time that the gun 108 is being inserted into or withdrawn from the holster 100.

Figure 6:
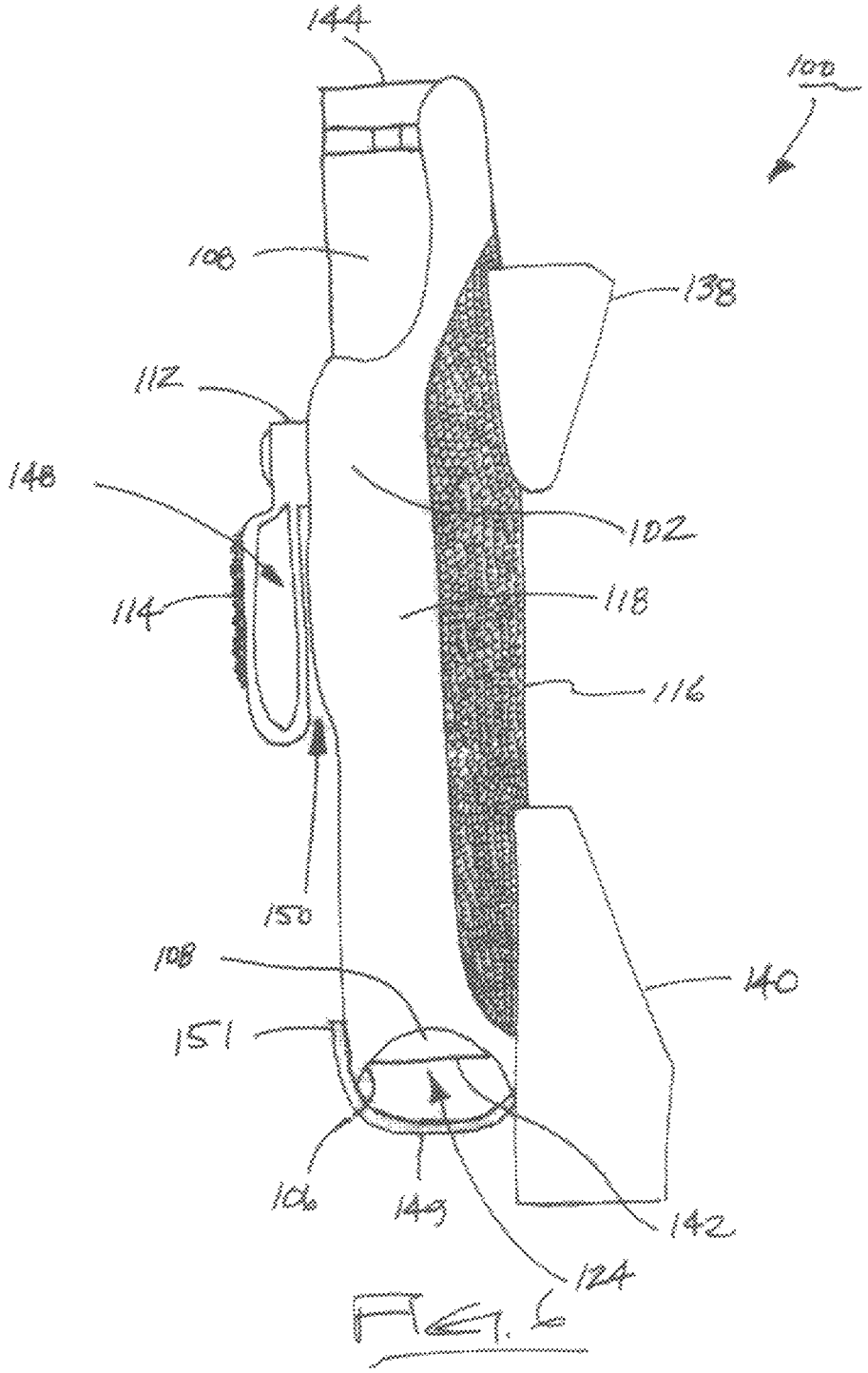
FIG. 6 is a side view of the holster of FIG. 1.

FIG. 6 is an elevational depiction of the holster 100 from a perspective of the end 118; a side view of FIG. 1. Each of a pair of concealment blocks 138, 140 is removably attachable to the inner side 116 in various locations and orientations so that they will be sandwiched between the holster 100 and the user's body when the holster 100 is worn. The larger concealment block 140 as depicted operably urges the muzzle-end 142 of a holstered gun 108 away from the user's body, thereby advantageously urging the grip 144 of the holstered gun 108 toward the user's body to better conceal the portion of the gun 108 above the user's waistband. The smaller block 138 as depicted may provide some counter bias to prevent the grip 144 from uncomfortably pressing into the user's body. For the user's comfort sake the concealment blocks 138, 140 may be constructed of a compressible foam material such as neoprene, or polychloroprene, a family of synthetic rubbers that are produced by polymerization of chloroprene.

The use and placement of the concealment blocks 138, 140 may vary. For example, the user may select one orientation (including no use) during prolonged sitting such as during driving, while selecting a different orientation (including no use) during prolonged standing or walking. To facilitate quick and easy adjustment the concealment blocks 138, 140 may be attached to the inner side 116 as depicted by using a hook and loop type fastener. Preferably, in that event the loop portion 146 is attached to the inner side 116 so that exposed portions, such as the entirety of the loop portion 146 when the user decides to not use any of the concealment blocks 138, 140, do not snag or abrade the user's body and/or underclothing.

FIG. 6 also depicts the aperture 148 defined by the belt loop 112 through which the user can thread a belt to secure the holster 100 on his waistband. The belt loop 112 provides a standoff gap 150 sized to receivingly engage the user's waistband to position the aperture 148 in the path of the user's belt and the sidewall 102 tucked inside the user's pants.

FIG. 6 also depicts a way of partially closing the cavity 124 as defined by the gun barrel edge 106 of the sidewall 102. The inner side 116 can have a tab that is long enough so that a medial portion 149 spans the cavity 124 and a distal portion 151 is attached to the outer side 110 of the sidewall 102. The distal portion 151 can be attached to the outer side 110 such as by using adhesive, upsetting, thermally fusing, using a fastener component, and the like. The tab may be covered with the loop portion of the hook and loop fastener to reduce friction under the user's clothing.

Figure 7:
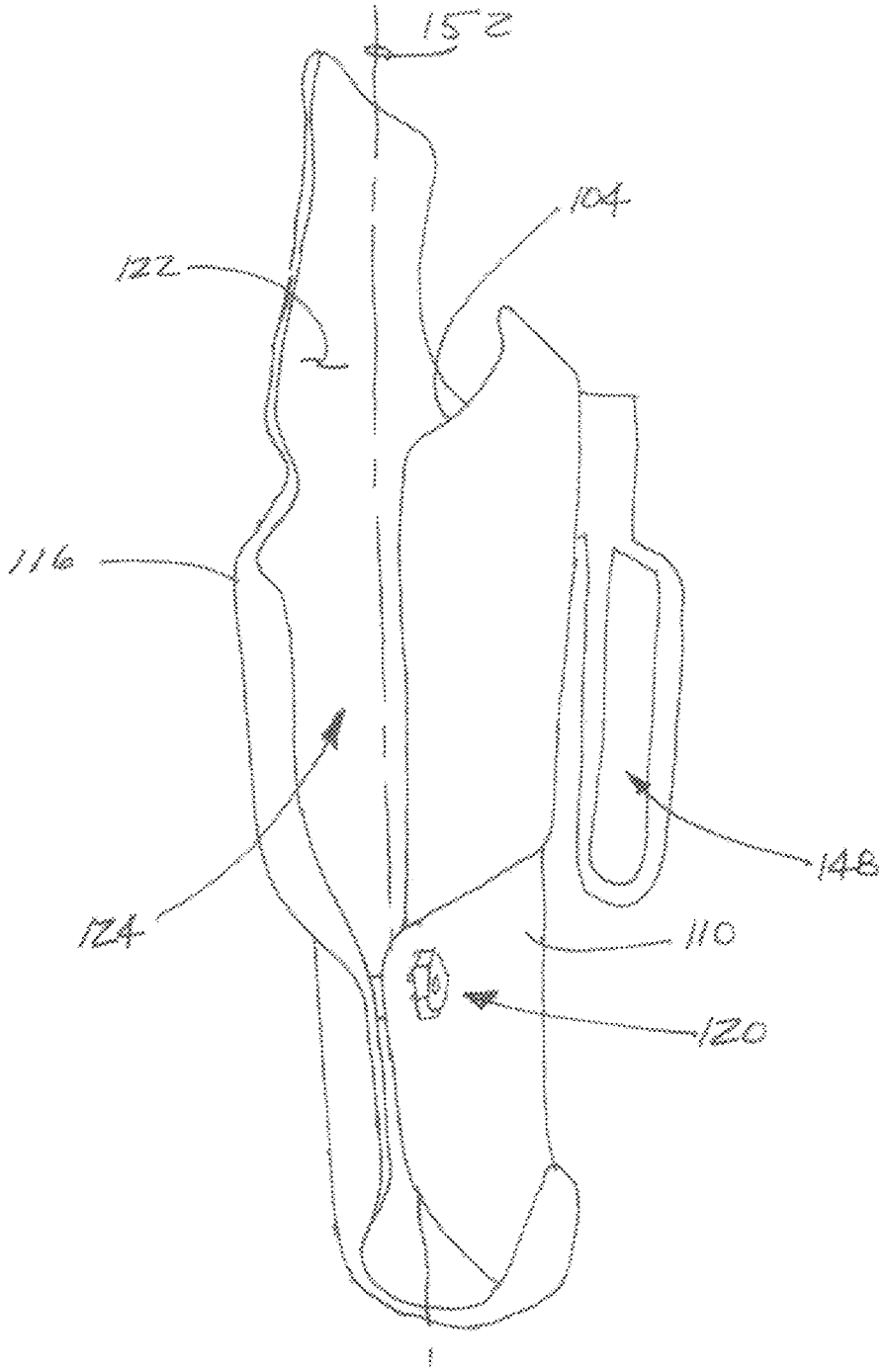
FIG. 7 is another side view of the holster of FIG. 1.

FIG. 7 is an elevational depiction from a perspective of the opposing side of the holster 100 as compared to FIG. 6, but without employing the loop portion of the hook and loop fastener. In these illustrative embodiments the gun entry edge 104 extends along both the outer and inner sides 110, 116 so that the cavity 124 includes a longitudinally-extending opening sized to receivingly engage the trigger guard of the gun (not depicted in FIG. 7). This view best depicts a longitudinal axis 152 along which the cavity 124 extends, varying in size longitudinally with respect to the cross sectional shape of the gun 108 in the holstered position.

Figure 8:
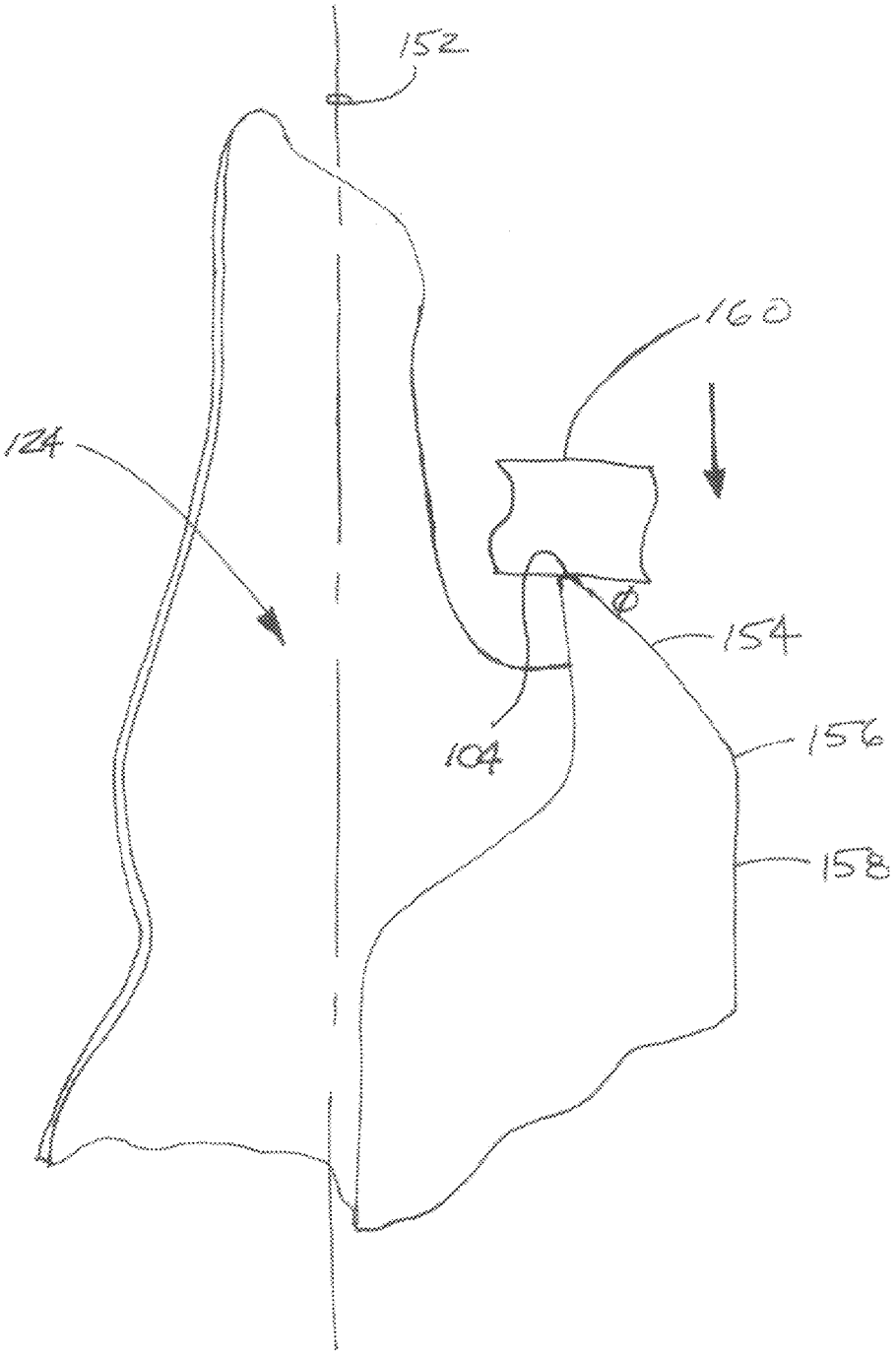
FIG. 8 is an enlarged detail view of a portion of FIG. 7.

FIG. 8 is an enlarged portion of FIG. 7 emphasizing a holster trigger guard 153 having an angled holster trigger guard surface 154 terminating at the gun entry edge 104 in these illustrative embodiments. It will be noted that in these illustrative embodiments the holster trigger guard surface 154 terminates at the gun entry edge 104 because the holster trigger guard 153 is formed as an angled portion of the longitudinally-extending sidewall 102. In these depicted embodiments a proximal end 156 of the holster trigger guard surface 154 is contiguous to another surface 158 of the sidewall 102 that is substantially parallel to the longitudinal axis 152 of the cavity 124. These illustrative embodiments leverage the ability to include the holster trigger guard 153 as a shape provided by thermally molding the stock material.

Figure 9:
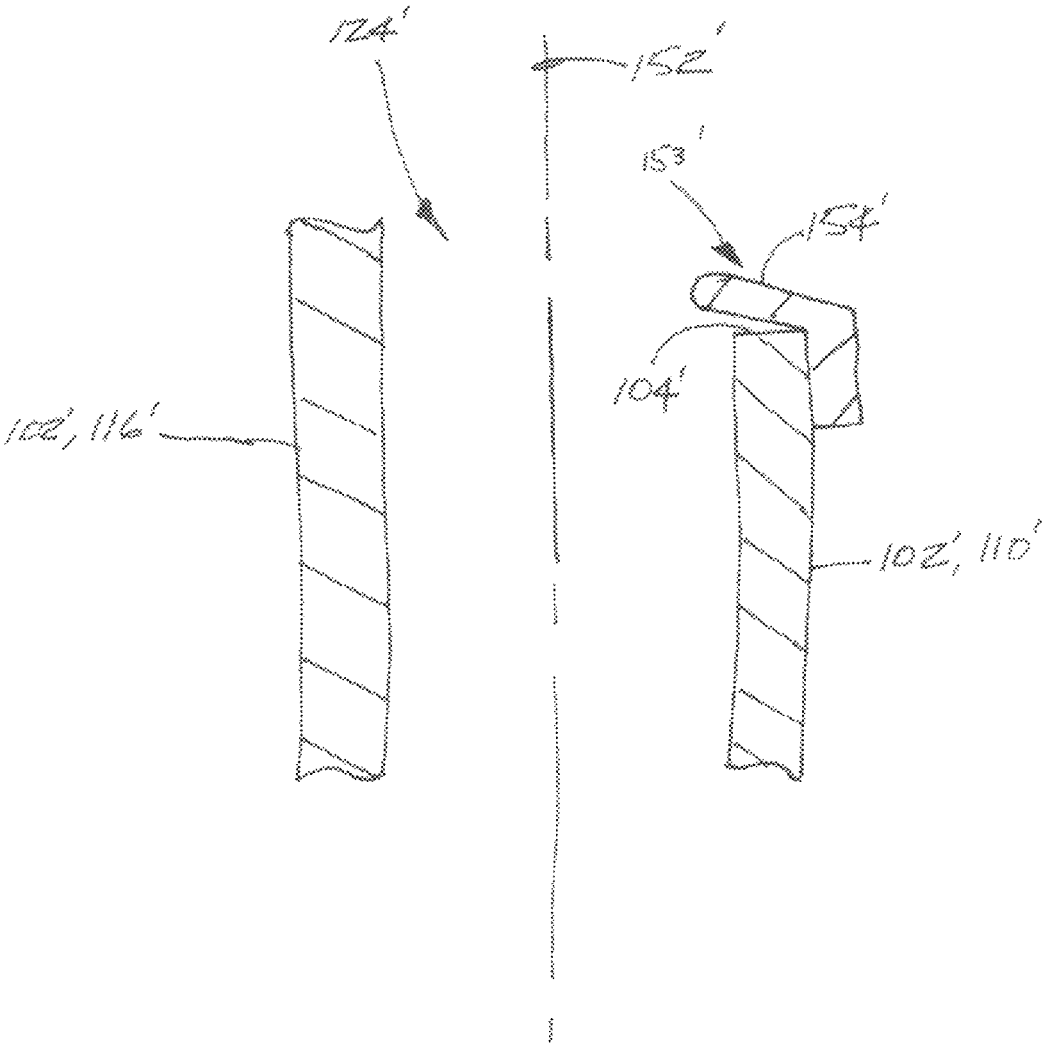
FIG. 9 is a cross-sectional depiction of a holster trigger guard constructed in accordance with equivalent alternative embodiments of the present technology.

However, the claimed embodiments are not so limited. FIG. 9 depicts equivalent alternative embodiments in which the holster trigger guard 153' (and holster trigger guard surface 154') is provided by a separate component that is attached to the sidewall 102.' The separate component may be attached by adhesive, upsetting, thermally fusing, or the use of a fastener and the like. In these illustrative alternative embodiments, the gun entry edge 104' is defined by the distal end of a sidewall 102' that is substantially parallel to the longitudinal axis 152' of the cavity 124.'

In either event, whether the holster trigger guard surface 154 is formed as a portion of the sidewall 102 (as depicted in FIG. 8) or provided by the attachment of another component (as depicted in FIG. 9), it is clear that in the most general terms the sidewall 102 supports the holster trigger guard surface (such as 154, 154') so that the trigger guard surface 154, 154' terminates adjacent the gun entry edge 104, 104' and adjacent the cavity 124, 124'. In either case the distal end of the trigger guard surface 154, 154' defines a portion of the leading end of the cavity 124, 124'.

Figure 10:
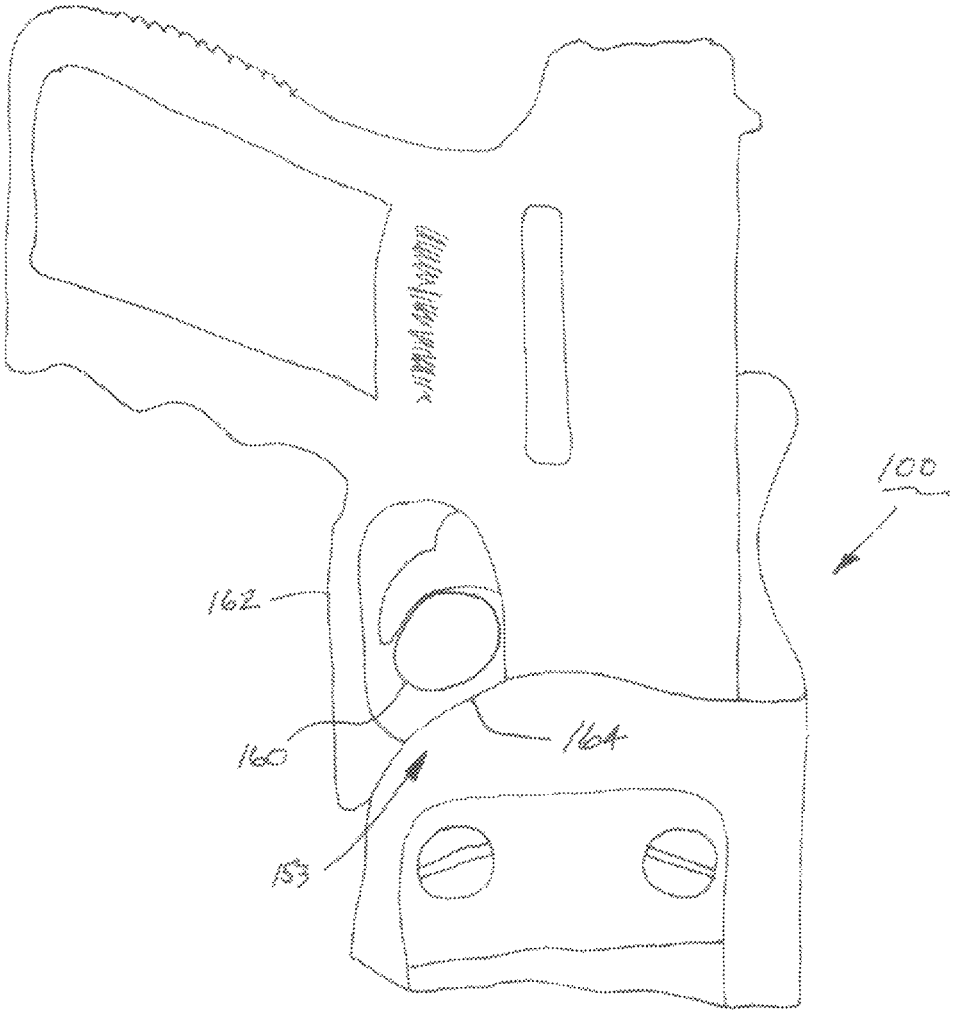
FIG. 10 is a view similar to FIG. 2 but with the gun only partially inserted into the holster.

The holster trigger guard surface 154, 154' (generally 154 etc.) has at least a planar segment that defines an acute angle, designated by $\phi$, with respect to the user's trigger finger 160 when the user's trigger finger 160 impacts the holster trigger guard surface 154. As diagrammatically depicted in FIG. 10, if the user inadvertently has his trigger finger 160 inside the gun's trigger guard 162 when he inserts the gun 108 into the holster 100, then his trigger finger 160 will first impact against the holster trigger guard 153 at the location designated by 164. The purpose of the holster trigger guard 153 is to impart a force (proximal force described below) during this impact that has a significant component in the proximal direction (a direction away from the distal tip of the finger) of the user's trigger finger 160. In the example of FIG. 8 the holster trigger guard surface 154 imparts the proximal force substantially perpendicular to and away from the longitudinal axis 152 of the cavity 124. That same direction of the proximal force in the example of FIG. 10 is in the direction out of the page.

Figure 11:
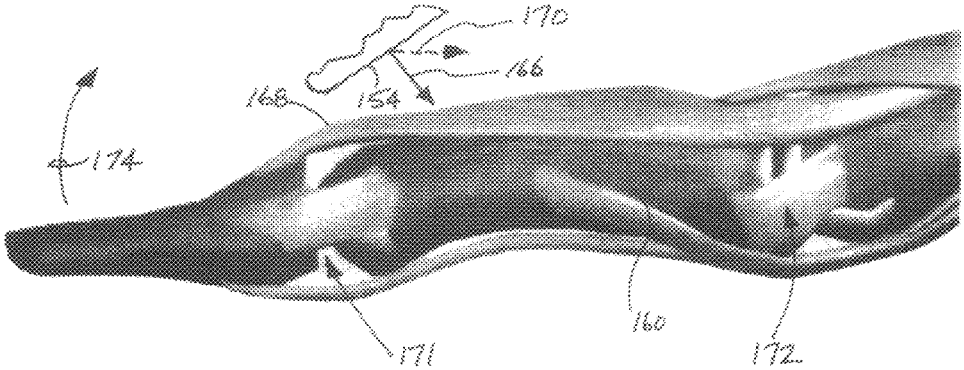
FIG. 11 is a musculoskeletal depiction of the gun user's trigger finger impacting the holster trigger guard when inserting the gun into the holster.

FIG. 11 is a musculoskeletal depiction of the user's trigger finger 160 moving in an upward direction here toward the impact against the angled holster trigger guard surface 154 as the user inserts the gun 108 into the holster 100 with his finger inadvertently remaining within the trigger guard 162 of the gun 108. The angled holster trigger guard surface 154 imparts the substantially perpendicular force denoted by 166 against the finger's extensor tendon 168 at or proximal to the distal interphalangeal (DIP) joint 171. Because of the acute angle (o in FIG. 10) of the holster trigger guard surface 154, the force 166 has a significant component of force denoted by 170 that is substantially in the proximal direction of the trigger finger 160, a proximal force 170 toward the proximal interphalangeal (PIP) joint 172. The proximal force 170 caused by impact of the user's trigger finger 160 against the angled holster trigger guard surface 154 reduces likelihood of a negligent discharge for at least of couple of reasons.

First, the proximal force 170 imparts a force that contracts the extensor tendon 168 between the point of impact and the distal end of extensor tendon 168 to extend the finger tip (the distal phalange) in a direction denoted by 174. That extension in direction 174 moves the fingertip away from the gun's 108 trigger, aiding in preventing a negligent discharge.

Second, the proximal force 170 against the user's finger creates tension in the extensor tendon 168 between the point of impact and the distal tip of the finger. Any attempt to flex the tip of the finger in a direction toward the gun's 108 trigger would be opposed by that tension in the extensor tendon 168, further aiding in preventing a negligent discharge of the gun 108

To best create the proximal force 170, the angle $\phi$ is an acute angle, preferably of about forty-five degrees or less. The distal end of the holster trigger guard surface 154 is preferably provided with an arcuate surface, such as a small radius, to prevent cutting the flesh on the user's trigger finger 160 as the result of this impact.

Figure 12:
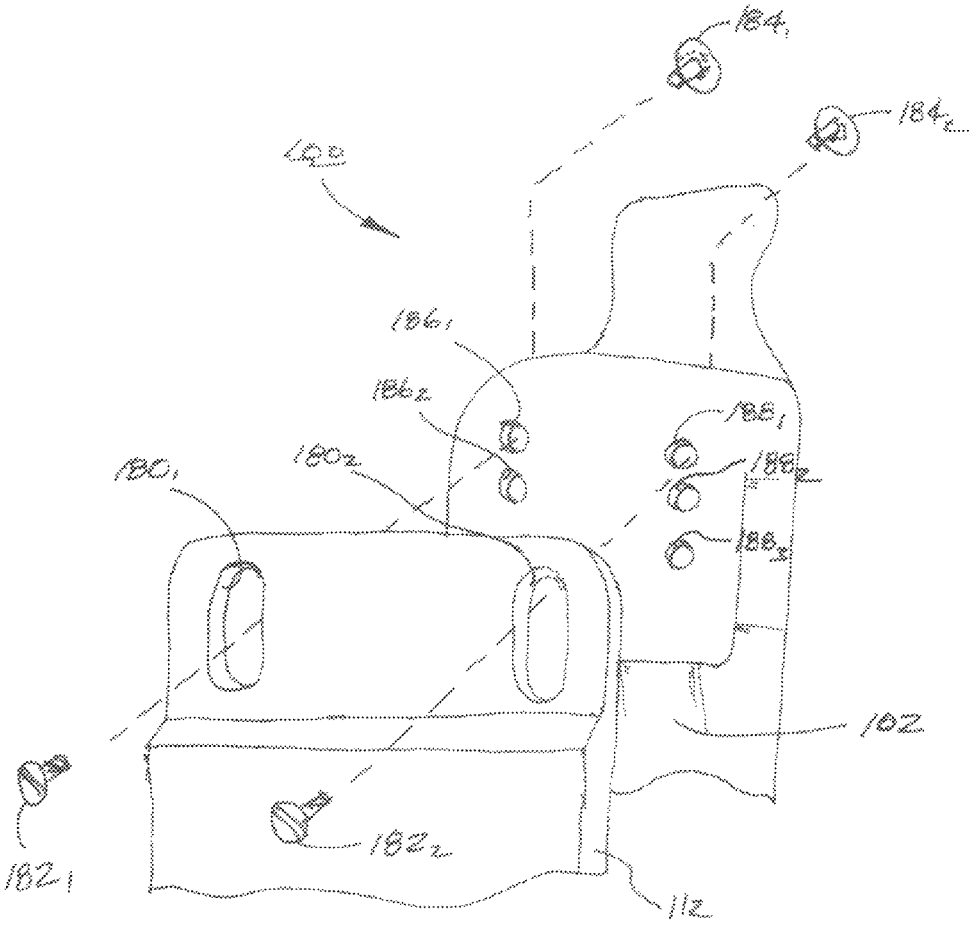
FIG. 12 is an exploded isometric depiction of the holster of FIG. 1.

FIG. 12 is an exploded isometric depiction of the holster 100 depicting a construction permitting adjusting the orientation of the sidewall 102 relative to the belt [clip] *loop* 112. The belt [clip] *loop* 112 defines a pair of slotted openings $\mathbf{180}_1$, $\mathbf{180}_2$ to each admit a removable fastener (such as a threaded screw) $\mathbf{182}_1$, $\mathbf{182}_2$. The fastener $\mathbf{182}_1$ is depicted as engaging a capturing member (such as a threaded insert) $\mathbf{184}_1$ inserted through an aperture $\mathbf{186}_1$ formed in the sidewall 102. When the fastener $\mathbf{182}_1$ and capturing member $\mathbf{184}_1$ are loosely joined, a minor range of adjustment is provided by the clearance of the slotted opening $\mathbf{180}_1$ around the fastener $\mathbf{182}_1$. A different range of adjustment can be provided by inserting the fastener $\mathbf{182}_1$ and the capturing member $\mathbf{184}_1$ through a different aperture $\mathbf{186}_2$ formed in the sidewall 102. The other fastener $\mathbf{182}_2$ and capturing member

184$_2$ can similarly be joined through the slotted opening 180$_2$ in the belt loop 112 and one of three apertures 188$_1$, 188$_2$, 188$_3$ formed in the sidewall 102. The slotted openings 180 and plurality of apertures 186, 188 provide the opportunity to wear the holster 100 at a desired angle, for the user's personal preference and comfort sake.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. Further, although the illustrative embodiments described herein are directed to carrying handguns, it will be appreciated by those skilled in the art that the claimed invention can be applied to other guns as well without departing from the spirit and scope of the present invention.

What is claimed is:

1. A holster for a gun, the holster protective of a user when holstering the gun with the user's finger remaining inside the gun's trigger guard, the holster comprising a sidewall terminating at a gun entry edge, the sidewall having an inner surface defining a cavity sized for the user to slidingly insert the gun in a longitudinal direction of the cavity to a mating engagement of the gun in the holster at a holstered position of the gun, the sidewall supporting a holster trigger guard terminating adjacent the gun entry edge, the holster trigger guard extending from the sidewall and defining an acute angle to the user's finger at contact of the holster trigger guard when the user's finger extends substantially perpendicular to the longitudinal axis of the cavity, *the sidewall forms a first side that is operably disposed nearest the user's body and an opposing second side, wherein the holster trigger guard surface is supported by the second side of the sidewall,*

*and further comprising a concealment block that is removably attachable to the first side of the sidewall at a selected one of a plurality of different attachable positions to be operably interposed between a user's body and the holster extending outward from the sidewall to urge a desired portion of the holster away from the user's body, the concealment block is removably attachable by a hook and loop fastener, the concealment block is constructed of a compressible foam material.*

[2. The holster of claim 1 wherein the sidewall forms a first side that is operably disposed nearest the user's body and an opposing second side, wherein the holster trigger guard surface is supported by the second side of the sidewall.]

3. The holster of claim [2] *1* wherein the sidewall spans from the first side to the second side defining a first end of the cavity, and wherein the first side and the second side are joined together by an adjustable connector defining an opposing second end of the cavity, the adjustable connector operable to selectively vary the size of the cavity.

[4. The holster of claim 2 comprising a concealment block that is removably attachable to the first side of the sidewall at a selected one of a plurality of different attachable positions to be operably interposed between a user's body and the holster to urge a desired portion of the holster away from the user's body.]

[5. The holster of claim 4 wherein the concealment block is removably attachable by a hook and loop fastener.]

[6. The holster of claim 4 wherein the concealment block is constructed of a compressible foam material.]

7. The holster of claim [2] *1* wherein the second side of the sidewall defines an aperture, and comprising a belt loop attachable to the second side by a fastener operably passing through the aperture.

8. The holster of claim 7 wherein the second side of the sidewall defines a plurality of apertures, and wherein the belt loop is selectively attachable at a first position by operably passing the fastener through a first aperture of the plurality of apertures, and the belt loop is selectively attachable at a second position by operably passing the fastener through a second aperture of the plurality of apertures.

9. The holster of claim 7 comprising a loop portion of a hook and loop fastener attached to the belt loop.

10. The holster of claim 1 wherein the angle is about forty-five degrees.

11. The holster of claim 1 wherein the angle is less than about forty-five degrees.

12. The holster of claim 1 wherein a distal end of the holster trigger guard surface terminates adjacent the gun entry edge, and wherein a proximal end of the holster trigger guard surface is adjacent a second surface of the sidewall that extends substantially parallel to the longitudinal axis of the cavity.

13. The holster of claim 1 wherein the holster trigger guard is a component attached to the sidewall.

14. The holster of claim 1 wherein the holster trigger guard is formed as a portion of the sidewall.

15. The holster of claim 14 wherein a distal end of the holster trigger guard surface terminates at the gun entry edge.

16. The holster of claim 15 wherein the gun entry edge defines an arcuate surface.

17. The holster of claim 1 wherein the sidewall defines a gun barrel edge opposing the gun entry edge and defining the cavity, wherein a tab formed as part of one of the first and second sides is connected to the other of the first and second sides to at least partially close the cavity as defined by the gun barrel edge.

[18. A holster for a gun, the holster comprising a longitudinally-extending sidewall terminating at an angled holster trigger guard surface adjacent a gun entry edge and defining a cavity sized for slidingly inserting the gun to a holstered position, and a concealment block that is removably attachable to the sidewall by a hook and loop fastener at a selected one of a plurality of different attachable positions to be operably interposed between a user's body and the holster to urge a selected portion of the holster away from the user's body.]

[19. A method comprising:

obtaining a holster having a longitudinally-extending sidewall terminating at a gun entry edge and defining a cavity, the upstanding sidewall providing an angled holster trigger guard surface;

selectively attaching a concealment block to the sidewall by a hook and loop fastener; and inserting a gun into the cavity so that a user's finger while disposed in the gun's trigger guard first contacts the angled holster trigger guard surface.]

*20. A holster for a gun, the holster protective of a user when holstering the gun with the user's finger remaining inside the gun's trigger guard, the holster comprising a sidewall terminating at a gun entry edge, the sidewall having an inner surface defining a cavity sized for the user*

*to slidingly insert the gun in a longitudinal direction of the cavity to a mating engagement of the gun in the holster at a holstered position of the gun, the sidewall supporting a holster trigger guard terminating adjacent the gun entry edge, the holster trigger guard extending from the sidewall and defining an acute angle to the user's finger at contact of the holster trigger guard when the user's finger extends substantially perpendicular to the longitudinal axis of the cavity, the sidewall forms a first side that is operably disposed nearest the user's body and an opposing second side, wherein the holster trigger guard surface is supported by the second side of the sidewall, the second side of the sidewall defines an aperture, and comprising a belt loop attachable to the second side by a fastener operably passing through the aperture, the second side of the sidewall defines a plurality of apertures, and wherein the belt loop is selectively attachable at a first position by operably passing the fastener through a first aperture of the plurality of apertures, and the belt loop is selectively attachable at a second position by operably passing the fastener through a second aperture of the plurality of apertures,*

*and further comprising a concealment block that is removably attachable to the first side of the sidewall at a selected one of a plurality of different attachable positions to be operably interposed between a user's body and the holster extending outward from the sidewall to urge a desired portion of the holster away from the user's body.*

*21. The holster of claim 20 comprising a loop portion of a hook and loop fastener attached to the belt loop.*

* * * * *